W. ATKINSON & C. C. KLEIN.
Shuttle-Box Mechanism for Looms.
No. 135,748. Patented Feb. 11, 1873.
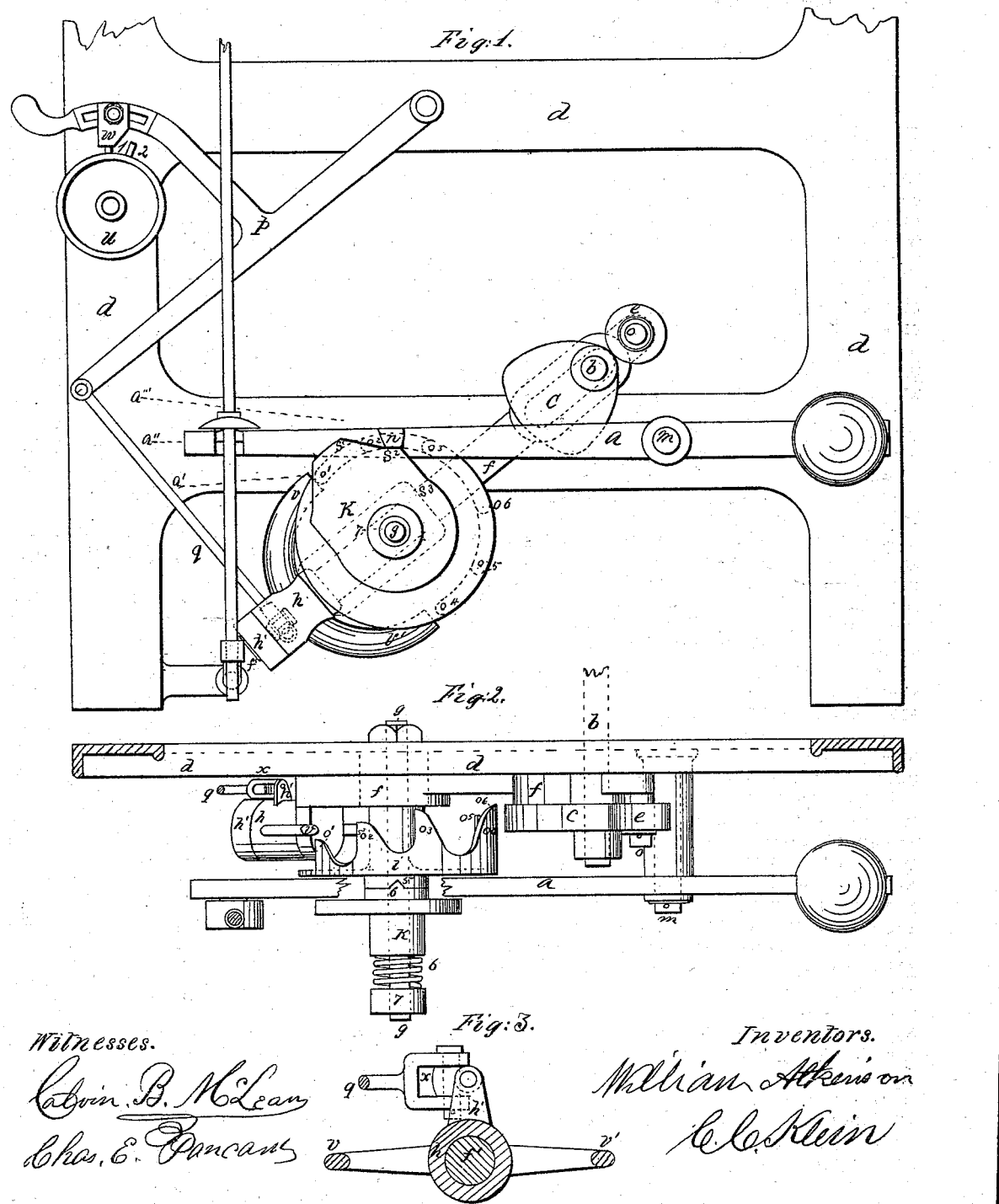

UNITED STATES PATENT OFFICE.

WILLIAM ATKINSON AND CHRISTIAN C. KLEIN, OF PHILADELPHIA, PENNSYLVANIA, ASSIGNORS TO THOMAS WOOD, OF SAME PLACE.

IMPROVEMENT IN SHUTTLE-BOX MECHANISMS FOR LOOMS.

Specification forming part of Letters Patent No. 135,748, dated February 11, 1873.

*To all whom it may concern:*

Be it known that we, WM. ATKINSON and CHRISTIAN C. KLEIN, of Philadelphia, in the county of Philadelphia and State of Pennsylvania, have invented certain Improvements in Box-Motions for Looms, of which the following is a specification:

The first part of our invention has for its object a better arrangement and combination of the different parts. The second part of our invention relates to an improved device for preventing breakage of the apparatus when anything interferes with its motion.

Figure 1 is a side view, and Fig. 2 a plan of the apparatus; Fig. 3 is a view in detail of the double pawl and its connection with the universal joint.

In regard to that part of our invention by which the motion of the shuttle-boxes is produced we do not claim any of the parts as new, as they all have been used in box-motions, but by the arrangement of the different parts the object of the apparatus—namely, to move the lever $a$ to the three different positions, $a'$ $a''$ $a'''$—is accomplished with less wear and tear to the working-parts, and requires less consumption of power and less skill in the operator. The second part of our invention consists of a clutch capable of sliding out of position when the strain upon it exceeds a certain limit in combination with the box-motion.

In the drawing, $d$ $d$ represent the frame of the loom by which all the parts are supported. The shaft $b$ gives motion to the whole by means of the cam $c$, which presses against the friction-roller $e$. This roller revolves around the stud $o$, which is fastened into a slotted hole in the upper end of the bar $f$, and as the cam $c$ revolves it causes the bar to slide in the direction of its length through a distance equal to the "throw" of the cam $c$. The revolving shaft $b$ and the stationary stud $g$ pass through the bar $f$, and the openings through which they pass are elongated in the direction of motion of the said bar $f$, so as to allow the motion imparted by the cam $c$ to take place. By this arrangement the expense of separate guides for the bar $f$ is done away with, as the shaft $b$ and stud $g$ answer for that purpose. The lower end of the bar $f$ is provided with a cylindrical stem, $f'$, on which the double pawl $h$ is swiveled, and the collar $h'$ serves to keep the double pawl on the stem $f'$. Upon the stud $g$ is placed a cylinder, $i$, the rim of which is formed into two series of steps, $o^1$ $o^2$ $o^3$ and $o^4$ $o^5$ $o^6$, $o^1$ corresponding in position to $o^4$, $o^2$ to $o^5$, and $o^3$ to $o^6$, one series being the reverse of the other. One series is used to raise, the other to depress, the boxes. The cam $k$, also on the stud $g$, is provided with two inclines corresponding in length to the steps on the cylinder $i$, which inclines act upon a stud on the lifting-lever, and are of such pitch as to give the required up-and-down movement to the shuttle-boxes. As the cam $k$ is connected with the cylinder $i$ by a clutch its oscillations must correspond with those of the cylinder. The lever $a$ oscillates around the fulcrum-stud $m$ and is provided with a projection, $n$, which rests upon the cam $k$. As long as the cam $k$ occupies the position shown in Fig. 1, the lever $a$ will remain in a horizontal position, $a''$, but if the point $s'$ is moved toward the fulcrum-stud $m$ until the projection $n$ rests upon $s^1$, the lever will rise to $a'''$; or, if we move the point $s^1$ the same distance to the left the lever $a$ will fall until it rests upon the point $s^3$ and occupies the position $a^1$. From Fig. 2 it will appear that the steps $o^2$ and $o^5$, and the stud on which the double pawl swivels, are placed in the same vertical plane, so that the wings $v$ and $v'$ of the double pawl will just touch $o^2$ and $o^5$ when the bar $f$ arrives at its highest point of motion, provided the position of $v$ and $v'$ is kept within the vertical plane, placing the bar $f$ in its middle position, as shown in Fig. 1. If the point $v$ is swung forward, it follows that, on the upward motion of the bar $f$, it will strike $o^1$ and will carry it to the point which was previously occupied by $o^2$, and at the same time the cam $k$ will have revolved through a corresponding space and the lever $a$ will have risen to $a'''$. If the points $v$ and $v'$ are swung out of the vertical plane in the opposite direction, the reverse of the previous motion will take place and the lever will fall to $a'$. The oscillation of the double pawl is accomplished and regulated by the pattern-wheel $u$, provided with pins 1 and 2. An intermittent revolving motion is imparted to the wheel in the usual manner. The pins 1 and 2 are of different lengths and act upon the shoe $w$ on the lever $p$, which latter is connected with the double pawl $h$ by the link $q$ and universal joint $x$, and the small arm $h'$ on the hub $h$.

As long as the pin 1 remains underneath the shoe $w$ the points $v$ and $v'$ of the double pawl will remain in the vertical plane and all the parts will assume the position shown in Fig. 1. If the pin is left entirely out of the rim of the wheel the shoe $w$ will rest upon the latter, the point $v$ of the double pawl will swing back and $v'$ forward, and the latter will catch $o^4$ and will move it the distance of one step, while the point $v$ will meet $o^3$, placing the lever, as shown at $a'$. If now the pin 2, which is twice as long as 1, is brought underneath the shoe $w$, the pattern-lever $p$ rises, the point $v$ of the double pawl will swing forward against catch $o^1$ and carry it two steps to the point previously occupied by the step $o^3$, and $v'$ will meet $o^6$, causing the lever to occupy the position $a'''$.

The whole mechanism is so arranged that the weaver is able to set the pins in the pattern-wheel $u$ with the least expenditure of thought—for instance, if he wishes to have his box-lever in the lowest position, $a'$, he will put his pattern-lever $p$ also into the lowest position by not putting any pin into the pattern-wheel; if he wishes to bring the lever $a$ into the central position $a''$, as shown in Fig. 1, he puts the lever $p$ also into the central position by using the short pin 1; and if he desires the lever $a$ at its highest point, he does this with the pattern-wheel lever $p$ by using the long pin 2.

It has already been mentioned that the cylinder $i$ and cam $k$ are connected by a clutch, both revolving together on the stud $g$; but it will be readily seen that if this connection were made positive and unyielding, and any foreign body should impede the motion of the acting parts a breakage would be the certain result. In order to prevent this, the sides of the clutch-prong 5, Fig. 2, on the cam $k$ are made inclined, fitting into a corresponding socket in the hub of the cylinder $i$. The spiral or rather helical spring 6, which presses against the hub of the cam $k$, holds the clutch-prong on $k$ in the socket of $i$ just firmly enough to do the required work, and as soon as that strain is exceeded, the spring 6 gives and allows the clutches to slide out of contact. The collar 7 can be moved on the stud $g$ to regulate the tension of the spring.

We do not claim anything which is not contained in the following clauses, although it may be described in the specification; but

What we claim as our invention is—

1. The cylinder $i$ with steps projecting from its face, and the cam $k$ provided with inclines, in combination with the swiveling double pawl $h$, carried by the reciprocating-bar $f$ and with the lifting-lever $a$, all constructed and operating substantially as described.

2. The cylinder $i$, having steps on its face, and the cam $k$, having inclines, in combination with the clutch 5, spring 6, and collar 7 upon the stud $g$ as and for the purpose set forth.

WILLIAM ATKINSON.
C. C. KLEIN.

Witnesses:
CALVIN B. McLEAN,
CHAS. E. PANCOAST.